(12) United States Patent
Fukuda

(10) Patent No.: US 8,606,977 B2
(45) Date of Patent: Dec. 10, 2013

(54) SYSTEM CONTROLLING DEVICE AND IMAGE PROCESSING SYSTEM

(71) Applicant: Michitaka Fukuda, Kanagawa (JP)

(72) Inventor: Michitaka Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/750,514

(22) Filed: Jan. 25, 2013

(65) Prior Publication Data

US 2013/0135656 A1    May 30, 2013

Related U.S. Application Data

(63) Continuation of application No. 11/950,515, filed on Dec. 5, 2007, now Pat. No. 8,386,670.

(30) Foreign Application Priority Data

Jan. 15, 2007 (JP) ................................. 2007-006314

(51) Int. Cl.
*G06F 3/00* (2006.01)
*G06F 13/38* (2006.01)
*G06F 13/12* (2006.01)
*G06F 3/12* (2006.01)

(52) U.S. Cl.
USPC .......... 710/52; 710/1; 710/5; 710/74; 358/1.1

(58) Field of Classification Search
USPC ......... 710/1, 5, 52, 74; 345/603, 501; 358/1.1
See application file for complete search history.

(56) References Cited

U.S. PATENT DOCUMENTS

| | | | |
|---|---|---|---|
| 6,044,178 | A | 3/2000 | Lin |
| 6,401,143 | B1 * | 6/2002 | Lupien et al. .................... 710/22 |
| 6,684,278 | B1 | 1/2004 | Sakugawa et al. |
| 2005/0248584 | A1 | 11/2005 | Takeo et al. |
| 2005/0254085 | A1 | 11/2005 | Oshikiri et al. |
| 2006/0227143 | A1 | 10/2006 | Maita et al. |
| 2006/0285155 | A1 | 12/2006 | Yamada et al. |

FOREIGN PATENT DOCUMENTS

| | | |
|---|---|---|
| CN | 2549543 Y | 5/2003 |
| CN | 1599400 A | 3/2005 |
| CN | 1777229 A | 5/2006 |
| JP | 10-301893 | 11/1998 |
| JP | 2003-345649 | 12/2003 |
| JP | 2004-32400 | 1/2004 |
| JP | 2004-178503 | 6/2004 |

(Continued)

OTHER PUBLICATIONS

Office Action issued Apr. 5, 2011 in Japanese Patent Application No. 2007-006314.

*Primary Examiner* — Farley Abad
(74) *Attorney, Agent, or Firm* — Oblon, Spivak, McClelland, Maier & Neustadt, L.L.P.

(57) ABSTRACT

A system controlling device having a tree structure includes a data controlling unit that functions as a root device. The data controlling unit is connected to a first image processing unit and a second image processing unit by separate high-speed serial buses. The first image processing unit performs image processing on image data scanned by a scanner, while the second image processing unit performs image processing on image data to be output to a printer. A storage unit is independently connected to the data controlling unit and stores therein image data processed by the first image processing unit and the second image processing unit.

19 Claims, 12 Drawing Sheets

(56) References Cited

FOREIGN PATENT DOCUMENTS

| | | |
|---|---|---|
| JP | 2004-221809 | 8/2004 |
| JP | 2004-310428 | 11/2004 |
| JP | 2005-92770 | 4/2005 |
| JP | 2005-210653 | 8/2005 |
| JP | 3720872 | 9/2005 |

\* cited by examiner

FIG.14

| STATE | MODE | TIME REQUIRED TO RETURN TO L0 MODE |
|---|---|---|
| L0 | ACTIVE | |
| L0s | LINK: COMMON-MODE VOLTAGE CLOCK AND MAIN POWER SUPPLY: ON | 16 ns TO 4 $\mu$s |
| L1 | LINK: COMMON-MODE VOLTAGE CLOCK: OFF MAIN POWER SUPPLY: ON | 1 $\mu$s TO SEVERAL $\mu$s |
| L2 | CLOCK AND MAIN POWER SUPPLY: OFF SUPPLY AUXILIARY POWER (VAUX) IF AVAILABLE | DEPENDENT ON SYSTEM |

TIME REQUIRED TO RETURN FROM L2 MODE DEPENDS ON POWER SUPPLY OR RISE TIME OF PLL

FIG.15

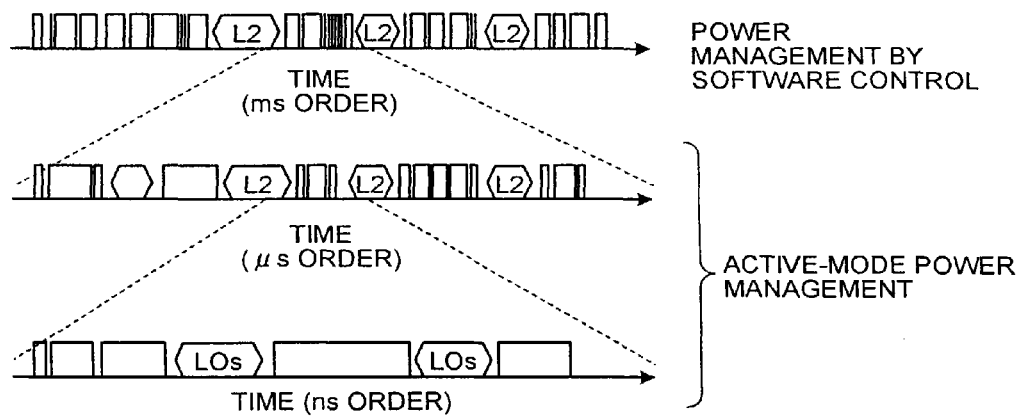

SYSTEM CONTROLLING DEVICE AND IMAGE PROCESSING SYSTEM

CROSS-REFERENCE TO RELATED APPLICATIONS

The present application is a continuation of, and claims the benefit of priority under 35 U.S.C. §120, from U.S. patent application Ser. No. 11/950,515, filed Dec. 5, 2007, which claims the benefit of priority under 35 U.S.C. §119, from Japanese priority document 2007-006314 filed Jan. 15, 2007, the entire contents of all of which are incorporated herein by reference.

BACKGROUND OF THE INVENTION

1. Field of the Invention

The present invention relates to a system controlling device and an image processing system.

2. Description of the Related Art

Generally, an image processing system such as a digital multifunction product (MFP) that processes image data includes units interconnected by parallel buses such as PCI buses. For example, Japanese Patent Application Laid-Open No. 2005-092770 discloses such a PCI bus connection.

FIG. 17 is an exemplary diagram of a system controlling unit 1000 in a conventional image processing system. The system controlling unit 1000 manages transfer of a large volume of image data between a plurality of units (devices), and, in an input-output mechanism of the image processing system, controls an input-output (I/O) device 2000 such that it can perform functions such as scanning and printing.

To achieve high-speed image processing in the image processing system, it is necessary to increase the operating speed of a central processing unit (CPU) 1001 or an external memory 1002. Similarly, to enable use of applications requiring high computational capacity and enhance connectivity between the units, it is necessary to speed up the flow of data (internal bandwidth) such as image data and control commands.

However, connecting the I/O device 2000 and the system controlling unit 1000 by a parallel PCI bus restricts high-speed transfer of a large amount of data.

For example, consider a case when the I/O device 2000 and the system controlling unit 1000 are connected by a 64-bit/33 MHz PCI bus. The actual bandwidth of the PCI bus is about 50% of the theoretical value, i.e., 64 bits×33.3 megahertz×0.5, which comes to about 130 MB/s. Meanwhile, to transfer eight-bit red-green-blue (RGB) scanned data of A4 size with 600 dots per inch (dpi) and having data compression ratio equal to one at a rate of one sheet of paper per second (no interval between sheets), a bandwidth of 100 MB/s is required because eight bit RGB data of A4 size with 600 dpi amounts to about 100 megabytes. Similarly, to transfer four-bit cyan-magenta-yellow-black (CMYK) printed data of A4 size with 600 dpi and having data compression ratio equal to one at a rate of one sheet of paper per second (no interval between sheets), a bandwidth of 66.7 MB/s is required because four-bit CMYK data of A4 size with 600 dpi amounts to about 66.7 megabytes. Hence, considering the actual bandwidth of the PCI bus, it is not possible to transfer the data at the rate of one sheet of paper per second unless a lighter data format is used or processing speed is reduced.

On the other hand, in case of a laser MFP having identical configuration as shown in FIG. 17, the data transfer needs to be in synchronization with the operations of the I/O device 2000. Moreover, to cut down the system cost, it is necessary to remove a memory 1007 connected to an application specific integrated circuit (ASIC) 1004 such that only one memory is used, viz., the external memory 1002 connected to a memory control hub 1003.

However, to perform the data transfer in synchronization with the operations of the I/O device 2000, it is necessary to extensively increase the bandwidth of an accelerated graphics port (AGP) bus connecting the ASIC 1004 and the memory control hub 1003. Hence, conventionally, the memory 1007 is used in addition to the external memory 1002 such that the need of data transfer related to copy processes through the AGP bus is eliminated, which results in securing a sufficient bandwidth.

For example, consider a case when the ASIC 1004 and the memory control hub 1003 are connected by an AGP ×4 bus. The actual bandwidth of that AGP ×4 bus is about 50% of the theoretical value, i.e., 32 bits×66.6 megahertz×4×0.5, which comes to about 500 MB/s. In the case where only the external memory 1002 is used by removing the memory 1007, the 500 MB/s becomes the upper limit of the bandwidth. Meanwhile, as described above, a bandwidth of 100 MB/s is required to transfer eight-bit red-green-blue (RGB) scanned data of A4 size with 600 dots per inch (dpi) and having data compression ratio equal to one at a rate of one sheet of paper per second (no interval between sheets). Moreover, a bandwidth of 100 MB/s is required to read the scanned data from the external memory 1002 and store it in a hard disk drive (HDD) 1006 via the memory control hub 1003 and the ASIC 1004. A bandwidth of 133.3 MB/s is required for the ASIC 1004 to read four-bit CMYK printed data of A4 size with 600 dpi from the external memory 1002, perform rotation on the data, and restore the rotated data in the external memory 1002 (four-bit CMYK data of A4 size with 600 dpi amounts to about 66.7 megabytes. Hence, 66.7 MB/s+66.7 MB/s=133.3 MB/s). A further 100 MB/s is required for the ASIC 1004 to re-read the rotated data from the external memory 1002, compress the data (data compression ration=2), and restore the compressed data in the external memory 1002 (66.7 MB/s+66.7 MB/s÷2=100 MB/s). Furthermore, when the compressed data is to be transferred to the I/O device 2000 at the rate of one sheet of paper per second (no interval between sheets), a bandwidth of 33.3 MB/s is required for the ASIC 1004 to read the data and decompress it (66.7 MB/s÷2=33.3 MB/s). Thus, the total required bandwidth amounts to:

100 MB/s+100 MB/s+133.3 MB/s+100 MB/s+33.3 MB/s=466.6 MB/s

That is, more than 90% of the actual bandwidth of the AGP ×4 bus is required for the abovementioned processing. Hence, the maximum possible rate of data transfer is about one sheet of paper per second. To increase the rate of data transfer, i.e., to enhance the productivity of the image processing system, it is necessary to use a lighter data format or reduce processing speed requirements.

SUMMARY OF THE INVENTION

It is an object of the present invention to at least partially solve the problems in the conventional technology.

According to an aspect of the present invention, a controlling device that includes a plurality of units forming a tree structure, the units being connected for data transfer on a point-to-point basis, includes: a controlling unit that is a root unit of the tree structure; a plurality of high-speed serial buses that are independently provided for the units to connect the units to the controlling unit; a first image processing unit that is connected to the controlling unit by one of the high-speed serial bus, and performs image processing on image data scanned by a scanner; a second image processing unit that is connected to the controlling unit by one of the high-speed serial bus, and performs image processing on image data to be output to a printer; and a storage unit that is independently connected to the controlling unit, and stores therein image data processed by the first image processing unit and the second image processing unit.

According to another aspect of the present invention, an image processing system includes: a scanner that scans an image and outputs image data of scanned image; a printer that prints the image on a recording medium based on the image data; and a controlling device that includes a plurality of units forming a tree structure and connected to each other for data transfer on a point-to-point basis. The controlling device includes: a controlling unit that is a root unit of the tree structure; a plurality of high-speed serial buses that are independently provided for the units to connect the units to the controlling unit; a first image processing unit that is connected to the controlling unit by one of the high-speed serial bus, and performs image processing on image data scanned by a scanner; a second image processing unit that is connected to the controlling unit by one of the high-speed serial bus, and performs image processing on image data to be output to a printer; and a storage unit that is independently connected to the controlling unit, and stores therein image data processed by the first image processing unit and the second image processing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a table for explaining link states;

FIG. 15 is a time-chart for explaining active-mode power management;

DETAILED DESCRIPTION OF THE PREFERRED EMBODIMENTS

Exemplary embodiments of the present invention are described in detail below with reference to the accompanying drawings.

First, detailed description is given about PCI Express (registered trademark) with reference to FIGS. 1 to 15.
Outline of PCI Express Standard A peripheral components interface (PCI) Express bus is a high-speed serial bus. A high-speed serial bus is an interface that can perform high-speed serial data transfer at more than about 100 megabytes per second through a single transmission path. The description of the PCI Express standard given below is based on selective extract from an article titled "Outline of PCI Express standard", by Hisashi Satomi, Interface, July 2003, which is incorporated herein by reference.

The PCI Express bus is a successor standard to the PCI bus and is compatible to all types of computers as a standard expansion bus. The PCI Express bus has various features such as low-voltage differential signal transmission, independent transmission and reception channels in point-to-point transmission, packetized split transaction, and high scalability due to different link configurations.

Figure 1:
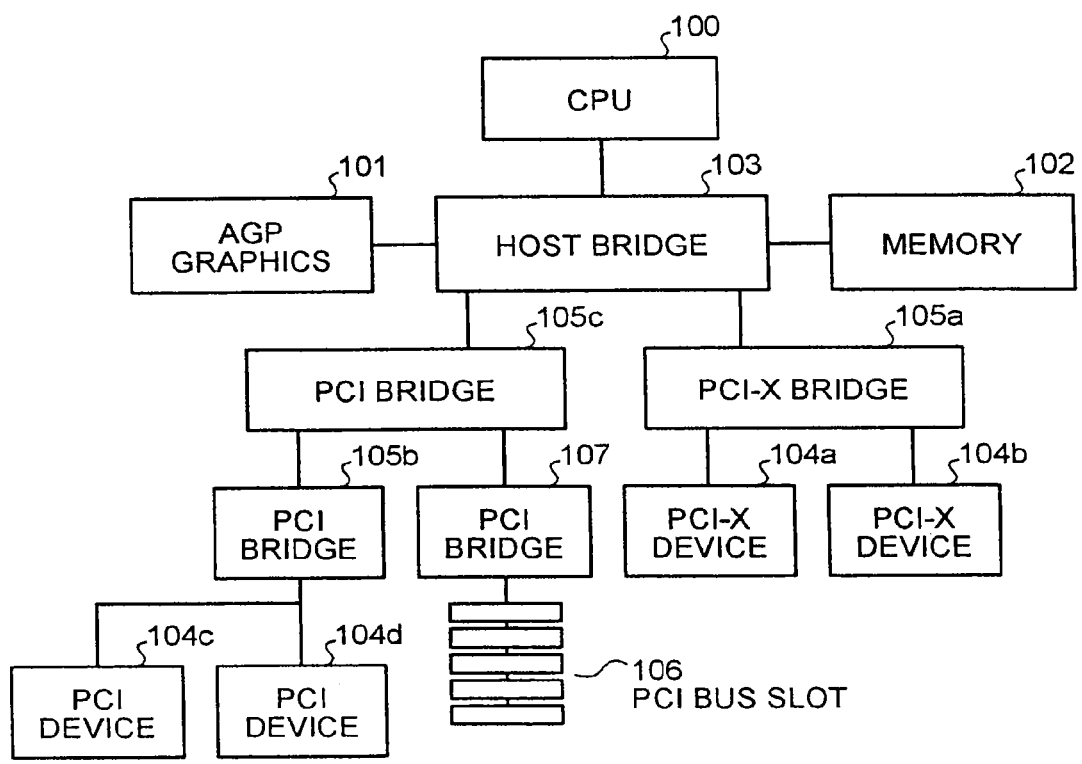
FIG. 1 is a schematic diagram of a conventional PCI system.

FIG. 1 is a schematic diagram of a conventional PCI system. The PCI system is a tree structure of a plurality of units connected directly or indirectly to a host bridge 103. Specifically, a central processing unit (CPU) 100, an accelerated graphics port (AGP) graphics 101, and a memory 102 are separately connected to the host bridge 103. PCI-X devices 104a and 104b (PCI-X: upward compatible standard of PCI bus) are connected to the host bridge 103 via a PCI-X bridge 105a. PCI devices 104c and 104d are connected to a PCI bridge 105b. A PCI bus slot 106 is connected to a PCI bridge 107. The PCI bridge 105b and the PCI bridge 107 are connected to the host bridge 103 via a PCI bridge 105c.

Figure 2:
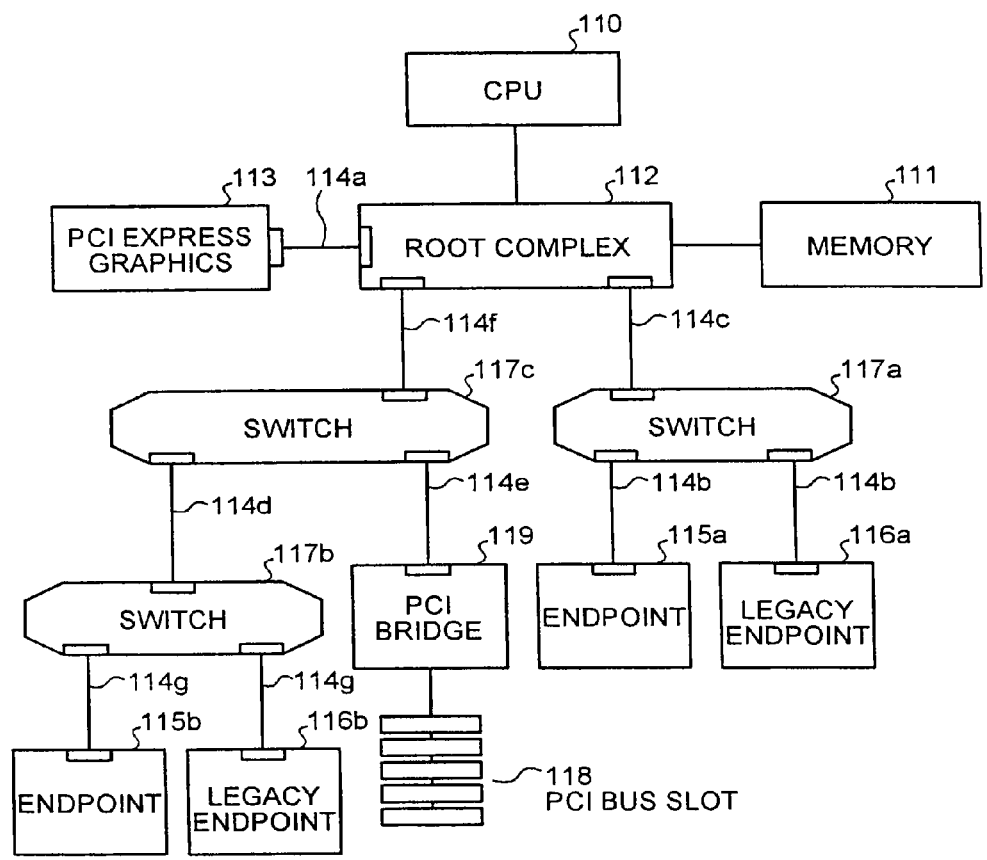
FIG. 2 is a schematic diagram of a PCI Express system.

FIG. 2 is a schematic diagram of a PCI Express system. The PCI Express system is also a tree structure of a plurality of units connected directly or indirectly to a root complex 112. Specifically, a CPU 110 and a memory 111 are separately connected to the root complex 112. A PCI Express graphics 113 is connected to the root complex 112 by a PCI Express link 114a. Each of an endpoint 115a and a legacy endpoint 116a are connected to a switch 117a by PCI Express links 114b, respectively. The switch 117a in turn is connected to the root complex 112 by a PCI Express link 114c. Similarly, each of an endpoint 115b and a legacy endpoint 116b are connected to a switch 117b by PCI Express links 114g, respectively. The switch 117b in turn is connected to a switch 117c by a PCI Express link 114d. A PCI bus slot 118 is connected to a PCI bridge 119 that in turn is connected to the switch 117c by a PCI Express link 114e. The switch 117c is connected to the root complex 112 by a PCI Express link 114f. Hereinafter, any one of the PCI Express links 114a to 114f is referred to as a PCI Express link 114 for the purpose of generalization.

Figure 3:
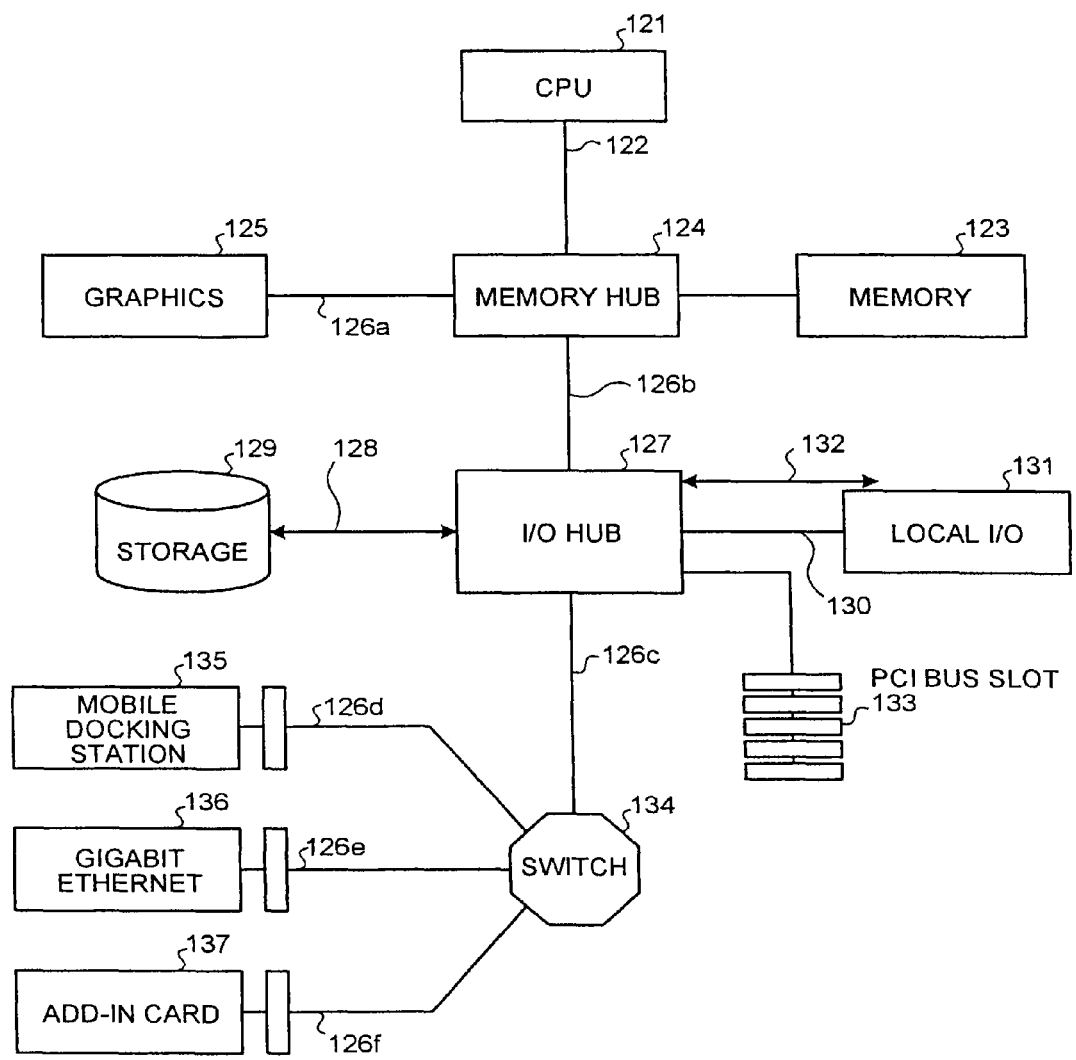
FIG. 3 is a schematic diagram of a PCI Express platform assumed to be implemented in a desktop computer or a mobile computer.

FIG. 3 is an exemplary schematic diagram of a PCI Express platform assumed to be implemented in a desktop computer or a mobile computer. As shown in FIG. 3, a CPU 121, a memory 123, a graphics 125, and an I/O hub 127 are connected to a memory hub 124 (equivalent to a root complex). The CPU 121 is connected to the memory hub 124 by a CPU host bus 122. The graphics 125 is connected to the memory hub 124 by, e.g., a PCI Express ×16 link 126a. The I/O hub 127 having conversion functionality is connected to the memory hub 124 by a PCI Express link 126b. A storage 129 such as HDD is connected to the I/O hub 127 by a serial advanced technology attachment (serial ATA) 128. A local I/O 131 is connected to the I/O hub 127 by a local procedure call (LPC) 130. A universal serial bus (USB) 2.0 132 and a PCI bus slot 133 are also connected to the I/O hub 127. Moreover, a switch 134 is connected to the I/O hub 127 by a PCI Express link 126c. A mobile docking station 135 is connected to the switch 134 by a PCI Express link 126d. A gigabit Ethernet (registered trademark) 136 is connected to the switch 134 by a PCI Express link 126e. An add-in card 137 is connected to the switch 134 by a PCI Express link 126f. Hereinafter, any one of the PCI Express links 126a to 126f is referred to as a PCI Express link 126 for the purpose of generalization.

Thus, a PCI Express bus in a PCI Express system replaces a conventional PCI bus, a PCI-X bus, and an AGP bus. Moreover, existing PCI/PCI-X devices are connected by using bridges, while chipsets are interconnected by a PCI Express bus. A conventional IEEE 1394 bus, a serial ATA bus, and a USB 2.0 bus are connected to a PCI Express bus via an I/O hub.

Components of a PCI Express Bus

A. Port/Lane/Link

Figure 4:
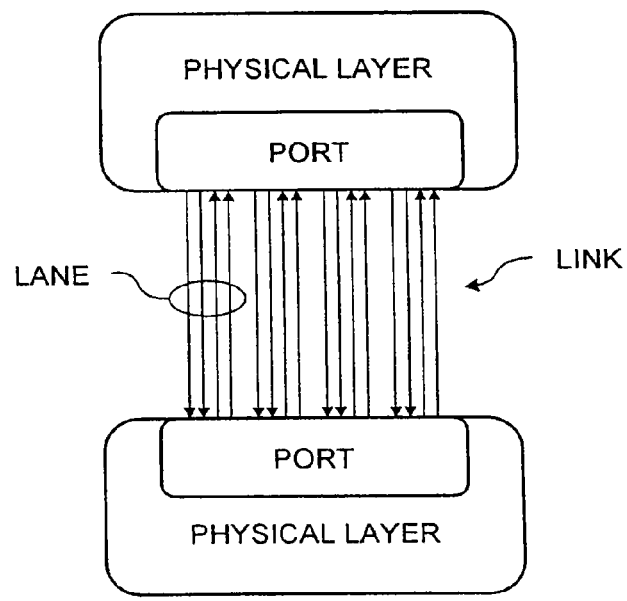
FIG. 4 is a schematic diagram for explaining a structure of a physical layer of the PCI Express system.
Figure 5:
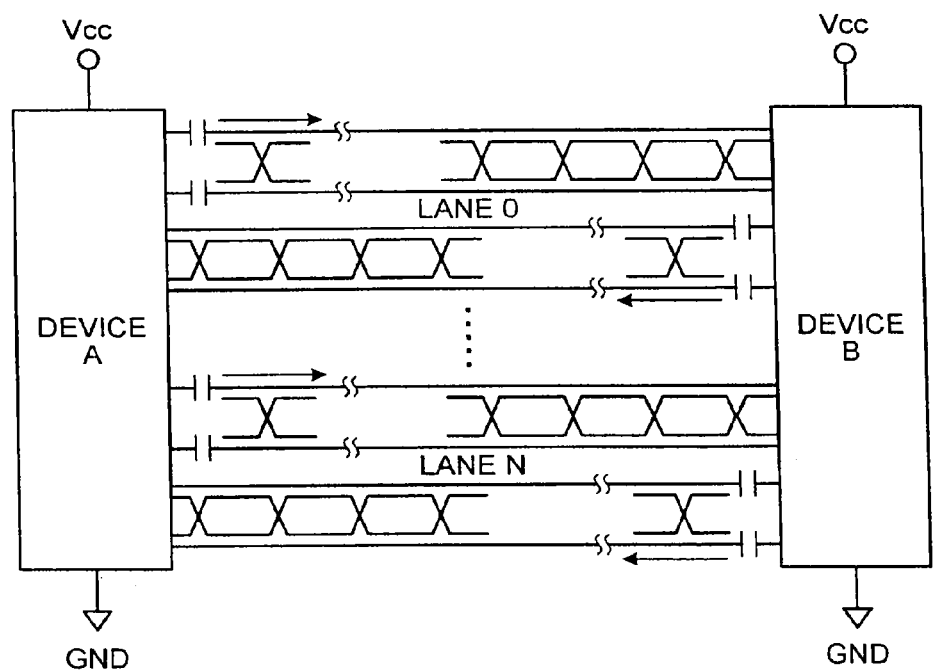
FIG. 5 is a schematic diagram for explaining connection of devices by lanes.

FIG. 4 is a diagram for explaining a structure of a physical layer of a PCI Express bus. A port in FIG. 4 is a group of transmitters and receivers forming a link, and functions as an interface for physically connecting hardware components by the link on a one-to-one basis (point-to-point basis). The port physically lies in the same semiconductor as that of the link and the hardware components. The rate of one-way data transfer in a link is, e.g., 2.5 gigabytes per second. A lane is a set of pairs of, e.g., 0.8 volt differential signals. That is, a lane is formed by a pair of signals at a transmission side and a pair of signals at a reception side. Thus, a link is formed by a group of two ports and lanes connecting the two ports, and is a dual simplex communication bus between hardware components. According to the current standard, an "×N link" includes N number of lanes, where the value of N can be 1, 2, 4, 8, 16, or 32. The example shown in FIG. 4 includes an ×4 link with four lanes. As shown in FIG. 5, the number of lanes N connecting a device A to a device B can be varied to configure a scalable bandwidth.

B. Root Complex

A root complex such as the root complex 112 in FIG. 2 is positioned at the highest level of an I/O structure, and connects a CPU and memory sub-systems to an I/O device. Generally, a root complex is referred to as a memory hub in a block diagram such as the memory hub 124 in FIG. 3. The root complex 112 (or the memory hub 124) has one or more PCI Express ports (root ports), each port forming an independent I/O hierarchical domain. The root complex 112 is shown to have three PCI Express ports in the form of rectangles therein. An I/O hierarchical domain is formed by a single endpoint and a single switch (such as the endpoint 115a and the switch 117a) or by a plurality of switches and endpoints (such as the endpoint 115b, the switch 117b, and the switch 117c). Hereinafter, any one of the switches 117a to 117c is referred to as a switch 117 for the purpose of generalization.

C. Endpoint

An endpoint such as the endpoint 115 in FIG. 2 is a device (particularly, a device other than a bridge) having a configuration space header of the type 00h. An end point can be a legacy endpoint or a PCI Express endpoint. A PCI Express endpoint is a base address register (BAR) that does not require an I/O resource, and consequently, an I/O request. Moreover, the PCI Express endpoint does not support a lock request.

D. Switch

Figure 6:
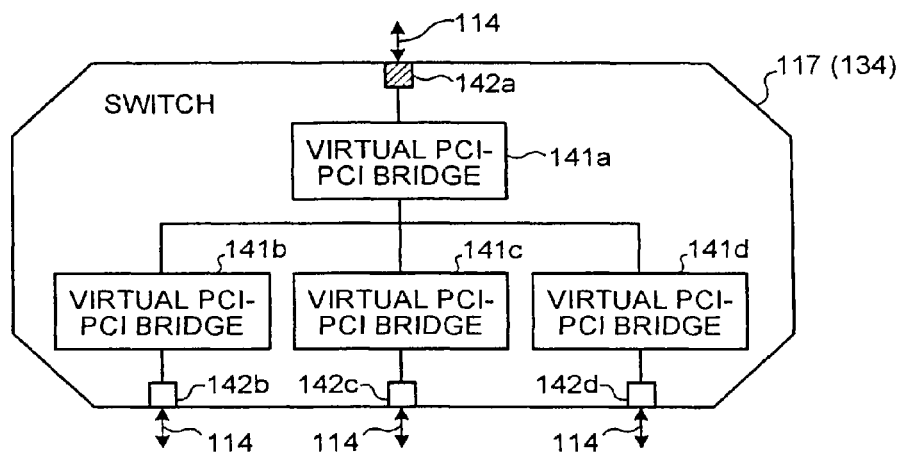
FIG. 6 is a schematic diagram for explaining a structure of a switch.

A switch such as the switch 117 in FIG. 2 (or the switch 134 in FIG. 3) is an interface between two or more ports for routing packets between the ports. As shown in FIG. 6, a configuration software recognizes the switch 117 (or the switch 134) as a group of virtual PCI-to-PCI (PCI-PCI) bridges 141 (i.e., a group of a virtual PCI-PCI bridge 141a, a virtual PCI-PCI bridge 141b, a virtual PCI-PCI bridge 141c, and a virtual PCI-PCI bridge 141d). Double-arrowhead lines in FIG. 6 indicate the PCI Express links 114 (or the PCI Express links 126). A port 142a is an upstream port near the root complex, while ports 142b to 142d are downstream ports far from the root complex.

E. PCI Express Link 114e for PCI Bridge 119

An existing PCI bus or a PCI-X bus (such as the PCI bridge 119) can be connected to a PCI Express system by a PCI Express link (such as the PCI Express link 114e).

Hierarchical Structure of a PCI Express Architecture

Figure 7A:
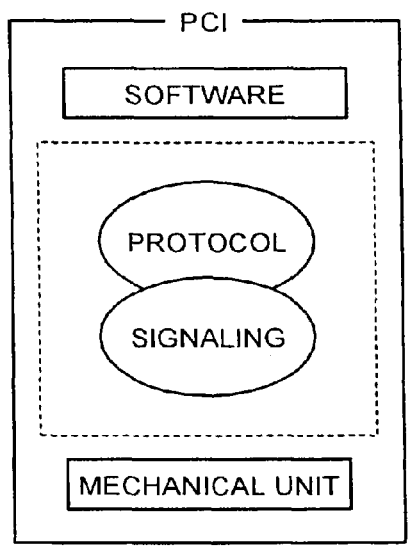
FIG. 7A is a schematic diagram for explaining an existing PCI architecture.
Figure 7B:
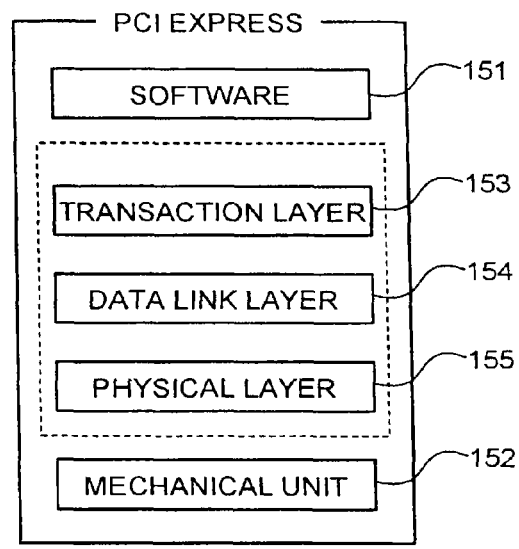
FIG. 7B is a schematic diagram for explaining a PCI Express architecture.

According to an existing PCI architecture shown in FIG. 7A, protocols and signaling are closely correlated without any hierarchy therebetween. However, a PCI Express architecture shown in FIG. 7B has an independent hierarchical structure such as a general communication protocol or Infini-Band with a defined specification for each layer of the hierarchical structure. The PCI Express architecture in FIG. 7B includes a transaction layer 153, a data link layer 154, and a physical layer 155 between software 151 as an uppermost layer and a mechanical unit 152 as a lowermost layer. Each of the abovementioned layers can be modularized thereby achieving scalability and enabling reuse of the modules. For example, to implement a new signal coding system or a new transmission medium, it is necessary to modify only the physical layer specifications without modifying the data link layer and the transaction layer.

The transaction layer 153, the data link layer 154, and the physical layer 155 form the central part of the PCI Express architecture. The function of each of those layers is described below with reference to FIG. 8.

A. Transaction Layer 153

Figure 9:
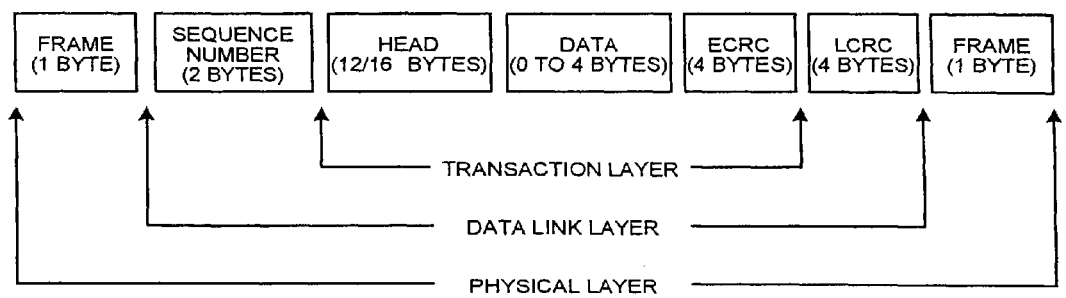
FIG. 9 is a schematic diagram for explaining a format of a transaction layer packet (TLP)

The transaction layer 153 is positioned at the top of the hierarchical structure of the PCI Express architecture and has a function of assembling and disassembling a transaction layer packet (TLP). The TLP is used to transmit transactions such as read/write transactions and various types of events. The transaction layer 153 also performs flow control of the TLP by using credits. FIG. 9 is an exemplary diagram for explaining a format of the TLP. The details of the TLP are described later.

B. Data Link Layer 154

The primary function of the data link layer 154 is to ensure data integrity of the TLP by means of error detection/correction (retransmission), and to perform link management. A packet called a data link layer packet (DLLP) is exchanged between the data link layers 154 for link management or flow control. The DLLP is referred to in that manner to distinguish it from the TLP.

C. Physical Layer 155

The physical layer 155 includes circuits such as a driver, an input buffer, a parallel-to-serial/serial-to-parallel converter, a phase-locked loop (PLL), and an impedance matching circuit that are necessary to perform interface operations. Moreover, the physical layer 155 performs initialization and stabilization of the interface as logical functions. The physical layer 155 also makes the data link layer 154 and the transaction layer 153 independent of signal techniques used in actual links.

Meanwhile, an embedded clock technique is employed in the hardware configuration of the PCI Express architecture. According to the embedded clock technique, clock timing is embedded in a data signal instead of embedding a clock signal such that the clock is obtained at the receiving side based on a cross point of the data signal.

Configuration Space

Figure 10:
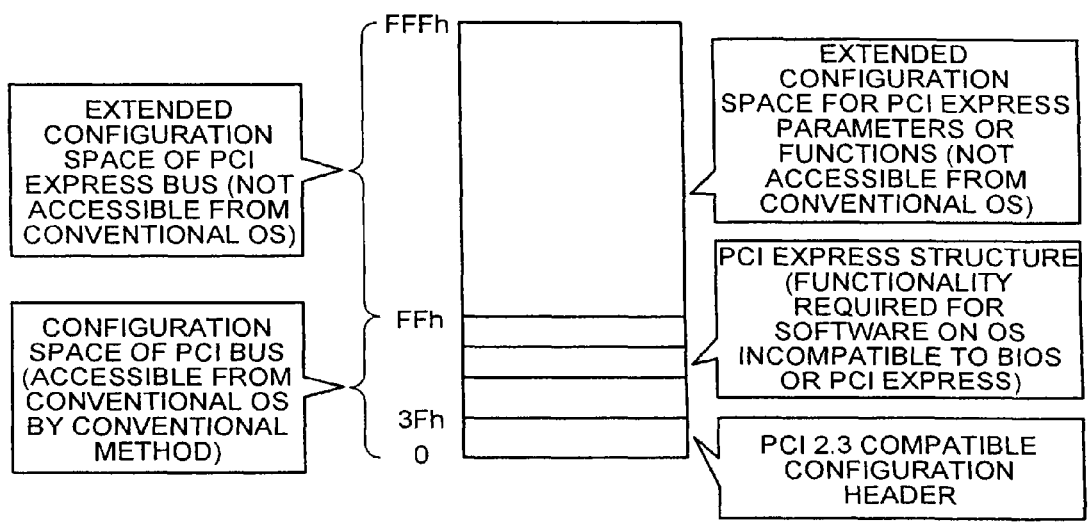
FIG. 10 is a schematic diagram for explaining a PCI-Express configuration space.

As shown in FIG. 10, an extended configuration space of 4,096 bytes is allotted to a PCI Express bus, as compared to a configuration space of 256 bytes allotted to a conventional PCI bus. Thus, a sufficiently large space can be secured for a device (such as a host bridge) that requires a plurality of device-inherent registers. The configuration space of the PCI Express bus can be accessed by accessing a flat memory space (configuration read/write). Buses, devices, functions, and register numbers are mapped to memory addresses.

The initial 256 bytes of the configuration space are allotted as a PCI configuration space and can be accessed by using an I/O port of a basic input/output system (BIOS) or a conventional operating system (OS). A mechanism to convert a conventional access into a PCI Express access is mounted on the host bridge. The section from 00h to 3Fh in FIG. 10 is a PCI 2.3 compatible configuration header that enables the use of a conventional OS or a conventional software for performing functions other than expanded functions of the PCI Express bus. In other words, the software layer in the PCI Express architecture inherits a load store architecture (an architecture in which a processor directly accesses an I/O register) that is compatible with an existing PCI bus. However, to use the expanded functions of the PCI Express bus (e.g., synchronous transfer, Reliability, Availability and Serviceability (RAS), etc.), it is necessary to have a four-kilobyte PCI Express expansion space in an accessible state.

A PCI Express bus can be available in various configurations such as an add-in card, a plug-in card (Express Card), and a Mini PCI Express.

Details of PCI Express Architecture

The transaction layer 153, the data link layer 154, and the physical layer 155 are described below in detail.

A. Transaction Layer 153

As described above, the transaction layer 153 is positioned between the high-end software layer 151 and the data link layer 154, and has a primary function of assembling and disassembling a TLP.

a. Address Space and Transaction Type

Four address spaces are defined in the PCI Express bus. That is, in addition to address spaces supported by a conventional PCI bus such as a memory space (for data transfer to the memory space), an I/O space (for data transfer to the I/O space), and a configuration space (for device configuration and setup), the PCI Express bus also has a message space defined therein. The message space is used for an in-band event notification and a general message transmission (exchange) between the PCI Express devices. Interruption requests and acknowledgements are transmitted by using a message as a 'virtual wire'. A transaction type is defined for each space. The memory space, the I/O space, and the configuration space are of a read/write type, while the message space is of a basic type (including a vender definition).

b. Transaction Layer Packet (TLP)

The PCI Express bus communicates on a packet basis. A length of the header according to the format of the TLP shown in FIG. 9 can be three double words (12 bytes) or four double words (16 bytes). The TLP includes a format (regarding a header length and a payload) of the TLP, a transaction type, a traffic class (TC), an attribute, and a payload length. The maximum payload length within the packet is 1,024 double words (4,096 bytes).

An end-to-end cyclic redundancy checksum (ECRC) is a 32-bit cyclic redundancy checksum (CRC) of the TLP for assuring end-to-end data integrity. The ECRC is used to detect an error in a TLP inside a switch because the error cannot be detected by a link cyclic redundancy checksum (LCRC).

Some requests require a complete packet, while other requests do not require a complete packet.

c. Traffic Class (TC) and Virtual Channel (VC)

A high-end software can differentiate (prioritize) the traffic by using a traffic class (TC). For example, data transfer can be prioritized such that image data has higher priority over network data. There are eight traffic classes from TC0 to TC7.

Figure 11:
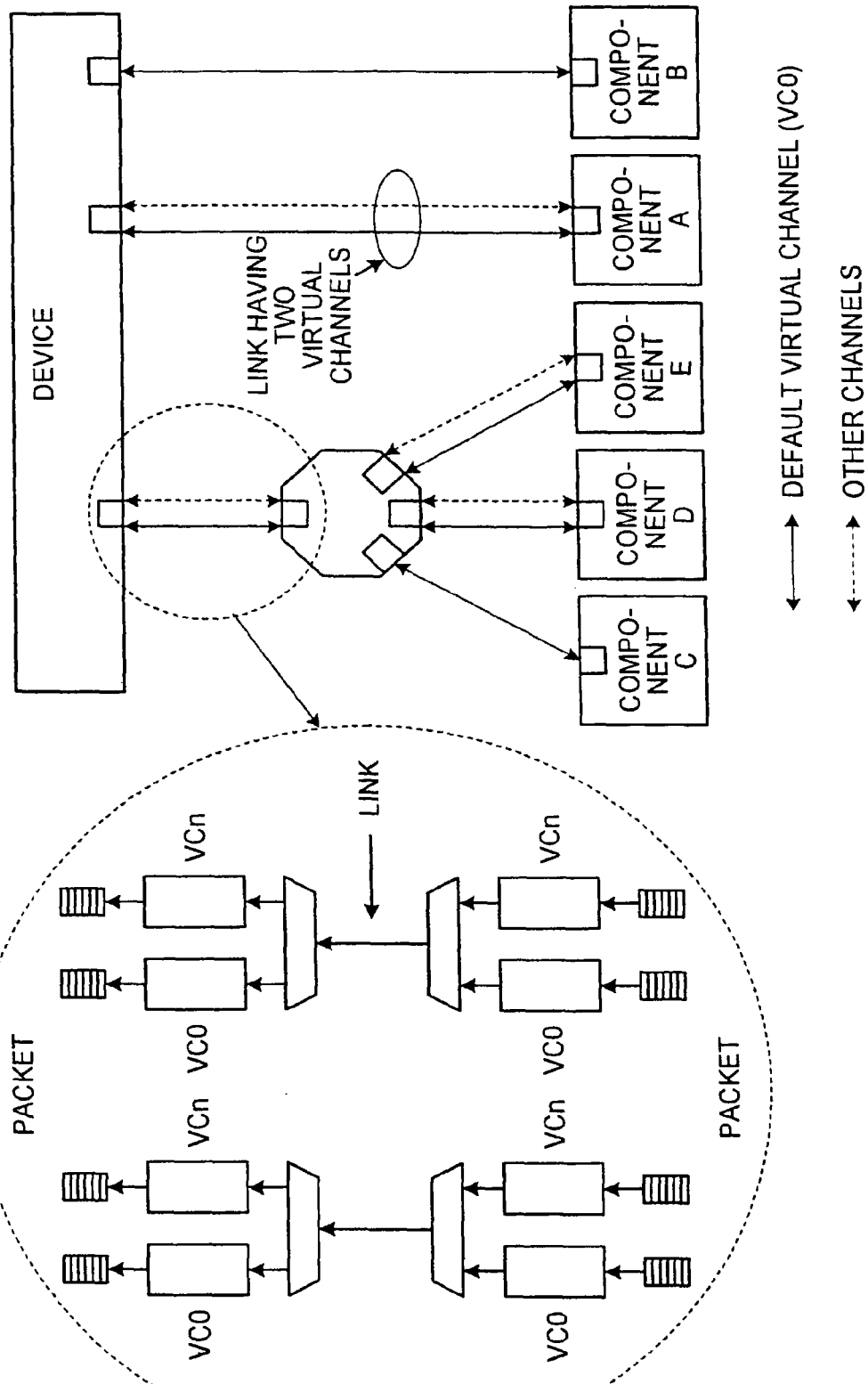
FIG. 11 is a schematic diagram for explaining the concept of virtual channels.

A virtual channel (VC) is an independent virtual communication bus (a mechanism in which a plurality of independent data-flow buffers share one link) and has its own resource (such as a buffer or a queue). As shown in FIG. 11, each virtual channel performs the flow control independently. Thus, even when the buffer of one virtual channel becomes full, data transfer can be performed by using another virtual channel. That is, to use a link efficiently, it can be allotted to a plurality of virtual channels. For example, as shown in FIG. 11, when a link from a root is allotted to a plurality of devices via by using a switch, the traffic from each device can be prioritized. As for the configuration of the virtual channels with reference to FIG. 11, a virtual channel VC0 (indicated by solid-line arrow) is a default virtual channel, while virtual channels (VC1 to VC7) (indicated by dotted-line arrow) are implemented depending on the cost performance.

The traffic classes are mapped to the virtual channels in the transaction layer. It is possible to map one or more traffic classes to one virtual channel when the number of virtual channels is less. For example, it is possible to map one traffic class to each of the virtual channels VC1 to VC7 at one-to-one basis or map all traffic classes to the virtual channel VC0. The traffic class TC0 is mapped to the virtual channel VC0 by default, while other mappings are determined by using a high-end software. Thus, it is possible to prioritize transactions by using the traffic classes in the software.

d. Flow Control

Flow control (FC) is performed to avoid overflow of a reception buffer and establish a transmission order. The flow control is performed on a point-to-point basis between links, but not on an end-to-end basis. As a result, during the flow control, it is not possible to confirm whether a packet has reached an eventual destination (completer).

The flow control of data transfer through a PCI Express bus is performed on a credit base. That is, before starting the data transfer, it is confirmed whether the buffer at the reception side has sufficient space to avoid overflow or underflow. In other words, at the time of initializing a link, the reception side sends a buffer capacity (a credit value) to the transmission side. The transmission side compares the credit value with the length of the packet to be transmitted and transmits the packet only when there is a specific amount of surplus credit value. There are six kinds of the credit.

The information regarding the flow control is exchanged using a DLLP of a data link layer. The flow control is performed only with respect to the TLP, and not with respect to the DLLP. That is, the DLLP is transmittable and receivable at any point of time.

B. Data Link Layer 154

As described above, the primary function of the data link layer 154 is to ensure a highly reliable TLP exchange between two hardware components over a link.

a. Handling of TLP

Upon receiving a TLP from the transaction layer 153, the data link layer 154 adds a two-byte sequence number at the start of the TLP and a four-byte LCRC at the end of the TLP (see FIG. 9) before transmitting the TLP to the physical layer 155. The TLP is stored in a retry buffer and retransmitted until an acknowledgement (ACK) is received from the reception side. If the TLP is not successfully transmitted after a number of tries, the link is determined to be having a defect and the physical layer 155 is requested to retrain the link. If training the link fails, the data link layer 154 shifts to an inactive state.

Upon receiving the TLP from the physical layer 155, the data link layer 154 checks the sequence number and the LCRC of a TLP for defects. If the sequence number and the LCRC are normal, the data link layer 154 transmits the TLP the transaction layer 153. In case of an error, the data link layer 154 requests the physical layer 155 to retransmit the TLP.

b. Data Link Layer Packet (DLLP)

Figure 12:
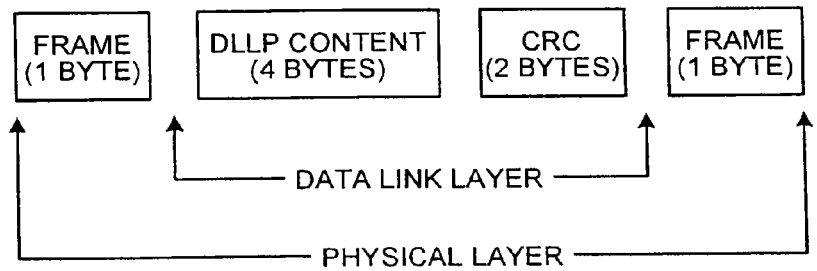
FIG. 12 is a schematic diagram for explaining a format of a data link layer packet (DLLP)

The TLP is transmitted from the physical layer 155 to each lane after being automatically segmented into a DLLP, as shown in FIG. 12. As described above, a packet generated by the data link layer 154 is called a data link layer packet (DLLP), and is exchanged between the data link layers 154. The DLLP can be of following types:

Ack/Nak: a DLLP for reception acknowledgement and retry (retransmission) of the TLP;

InitFC1/InitFC2/UpdateFC: a DLLP for initialization and update of flow control; and a DLLP for power supply management.

As shown in FIG. 12, the size of a DLLP is six bytes that include a DLLP type (one byte) indicating the type of DLLP, unique information regarding the type of DLLP (three bytes), and a CRC (two bytes).

C. Logical Sub-Block 156 in Physical Layer 155

Figure 8:
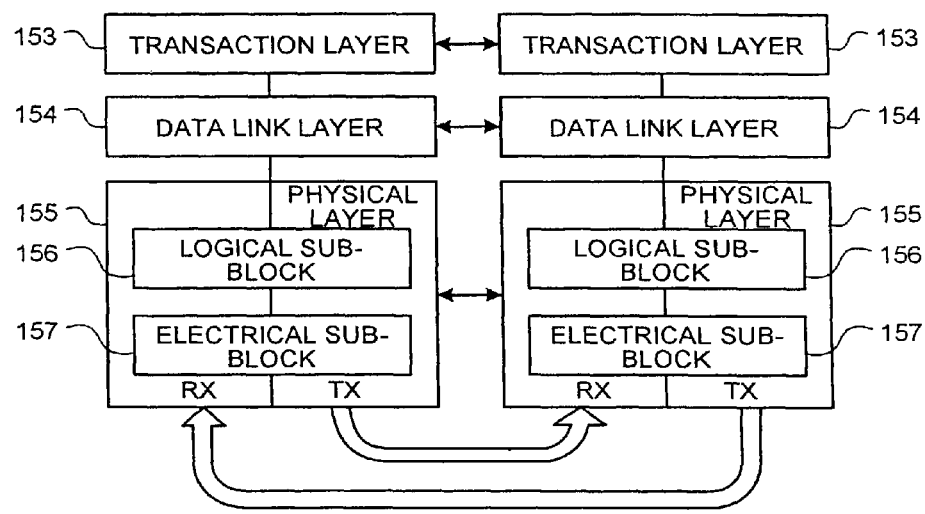
FIG. 8 is a schematic diagram for explaining a hierarchical structure of the PCI Express architecture.

The primary function of a logical sub-block 156 in the physical layer 155 shown in FIG. 8 is to convert a packet received from the data link layer 154 into a format transmittable by an electrical sub-block 157. The logical sub-block 156 controls and manages the physical layer 155.

a. Data Encoding and Parallel-to-Serial Conversion

Figure 13:
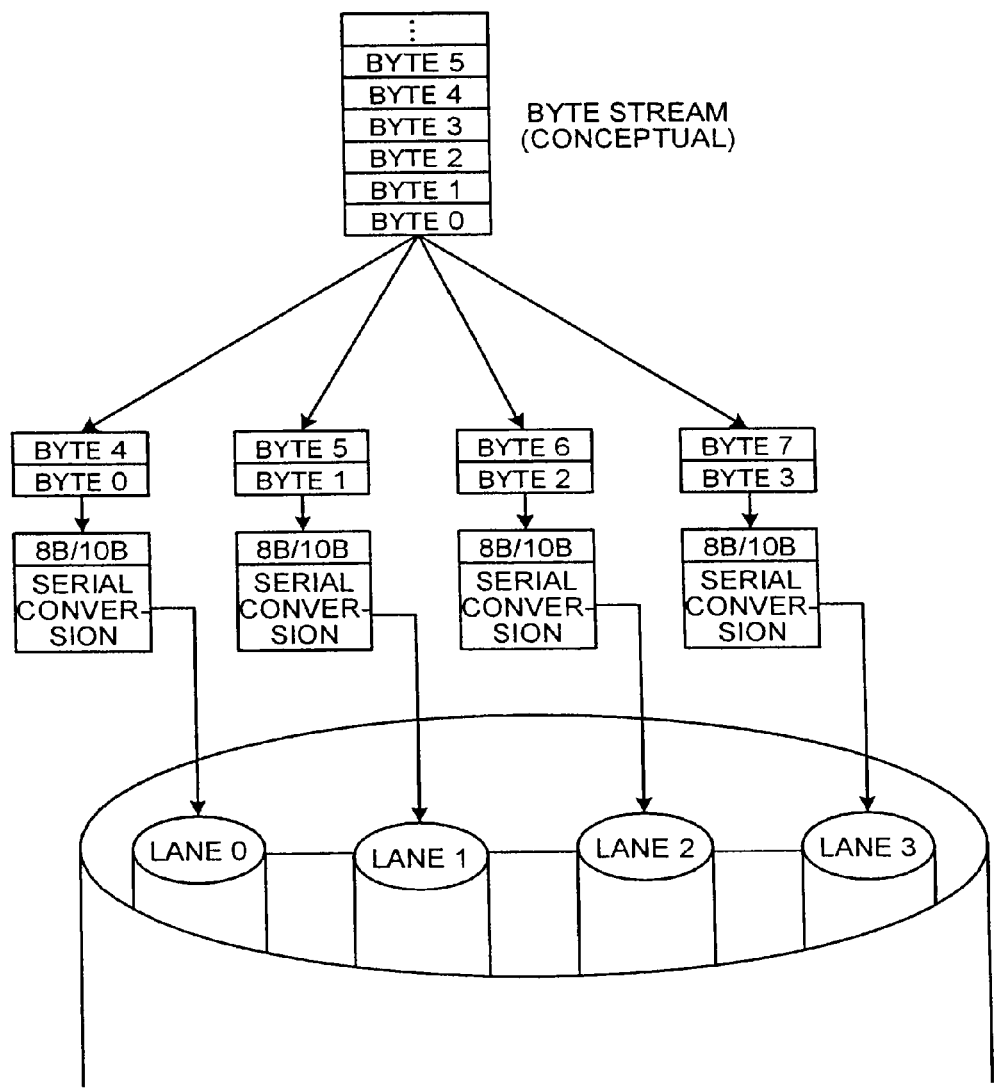
FIG. 13 is a schematic diagram for explaining byte striping in an ×4 link.

As shown in FIG. 13, an 8-byte/10-byte conversion is used for data encoding in the PCI Express bus such that continuation of "0" or "1" in the data is avoided. That is, data encoding is performed to avoid a state of no cross point for a long time. The encoded data is then subjected to serial conversion and transmitted to the lanes. The least significant bit (LSB) of the data is transmitted first. In the case of a plurality of lanes (such as the example of byte striping in an ×4 link shown in FIG. 13), the yet to be encoded data is allocated to each lane on a byte basis. Although such an arrangement might look like a parallel bus arrangement, the problem of skewing is substantially reduced because the data is transferred independently at each lane.

b. Power Supply Management and Link State

To maintain power consumption of the link at low level, link states, viz., L0, L0s, L1, and L2 are defined as shown in FIG. 14.

L0 indicates an active (normal) mode of the link state. L0s to L2 indicate the link states with less power consumption. Although the power consumption is less at L0s to l2, it also takes time to return to L0. As shown in FIG. 15, the power consumption can be minimized by active-mode power management in addition to a software-based power management.

D. Electrical Sub-Block 157 in Physical Layer 155

The main feature of the electrical sub-block 157 in the physical layer 155 is to transmit serial data, which is subjected to serial conversion at the logical sub-block 156, over a lane, and to transmit data from the lane to the logical sub-block 156.

a. AC Coupling

A capacitor for AC coupling is mounted at the transmission side of the link such that the DC common-mode voltage at the transmission side need not be equal to the DC common-mode voltage at the reception side. Such an arrangement enables the use of different configuration designs, different semiconductor processes, or different supply voltages at the transmission side and the reception side, respectively.

b. De-Emphasis

As described above, an 8-byte/10-byte conversion is used for data encoding in the PCI Express bus such that continuation of "0" or "1" in the data is avoided as far as possible. However, continuation of "0" or "1" in the data still occurs in some cases (for five times at a maximum). In such cases, it is prescribed to perform a de-emphasis transfer at the transmission side. That is, when bits of same polarity are present in continuation, it is necessary gain noise margin of the signals received at the reception side by dropping a differential voltage level (amplitude) of the second bit and the subsequent bits by 3.5±0.5 bytes. This is called de-emphasis. Because of frequency dependency attenuation of a transmission path, bits having high-frequency components vary, which results in small waveform at the reception side. On the other hand, bits having fewer high-frequency components do not vary, which results in relatively large waveform at the reception side. Therefore, de-emphasis is performed to obtain a constant waveform at the reception side.

Image Processing System

An image processing system according to an embodiment of the present invention includes the abovementioned high-speed serial buses according to the PCI Express standard as internal interfaces between units therein. The image processing system is explained below as a digital multifunction product (MFP) that combines any or all of the functions of copying, facsimile (faxing), printing, scanning, and delivering image data (input by scanning, printing or faxing).

Figure 16:
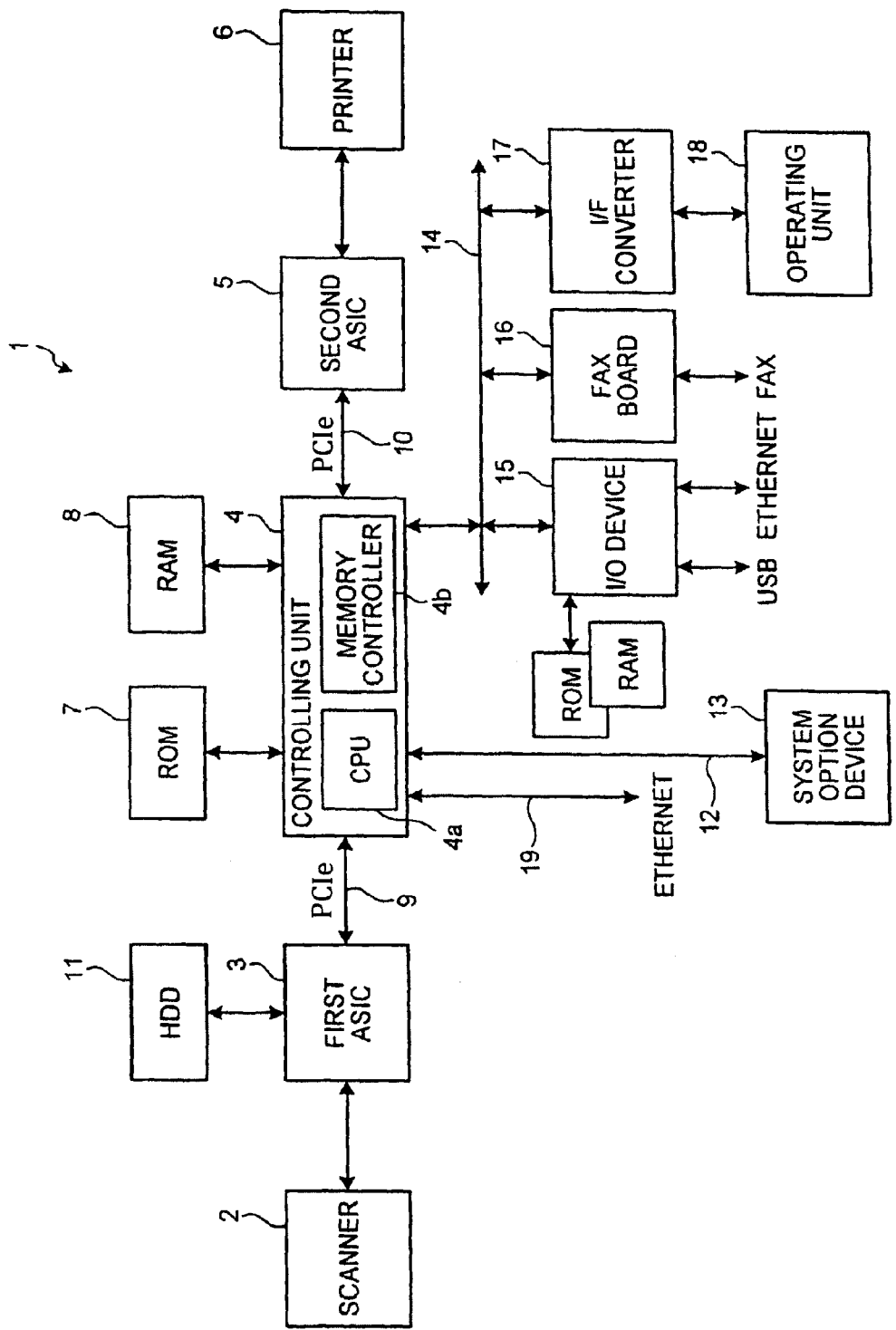
FIG. 16 is a schematic diagram of an image processing system according to an embodiment of the present invention.
Figure 17:
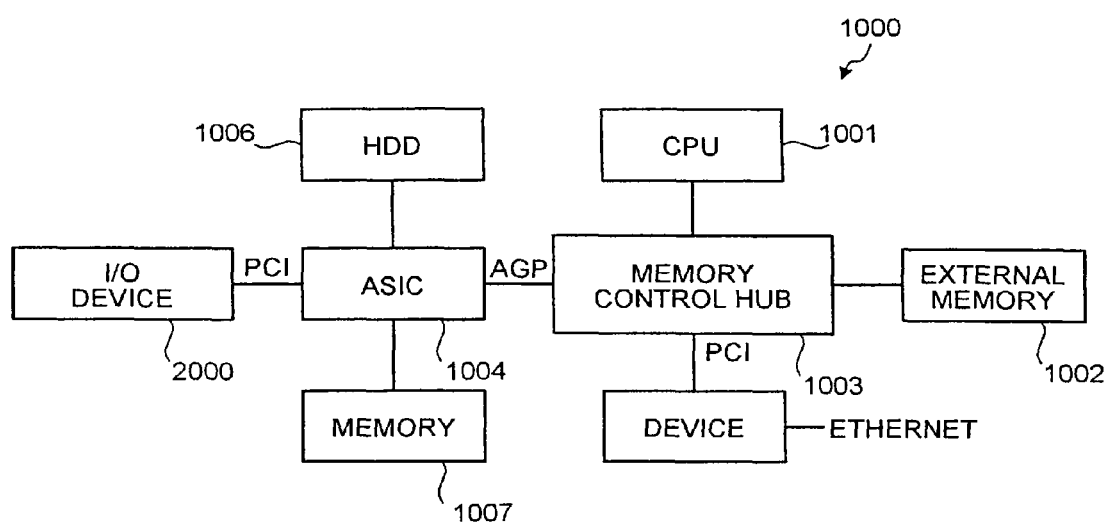
FIG. 17 is a schematic diagram of a system controlling unit in a conventional image processing system.

FIG. 16 is an exemplary diagram of the image processing system according to the embodiment. The image processing system includes a system controlling device 1, a scanner 2, and a printer 6. The system controlling device 1 includes a first image processing device 3, a controlling unit 4, and a second image processing device 5. The image processing devices 3 and 5 are each an application specific integrated circuit (ASIC) for image processing, and hence hereinafter referred to as first ASIC and second ASIC, respectively.

The controlling unit 4 includes a central processing unit (CPU) 4a and a memory controller 4b. The CPU 4a controls the image processing system based on a software program installed therein, while the memory controller 4b is equivalent to a root complex of the PCI Express standard, i.e., a root device of a tree structure of the PCI Express architecture. The memory controller 4b controls a read only memory (ROM) 7 that stores therein computer programs and a random access memory (RAM) 8 that stores therein image data and computer programs. The memory controller 4b also administers data transfer to a plurality of I/O devices connected to the controlling unit 4. Thus, the image processing system is configured such that the ROM 7 and the RAM 8 are connected only to the controlling unit 4, as shown in FIG. 16. The first ASIC 3 is connected to the controlling unit 4 by a first PCI Express bus 9, while the second ASIC 5 is connected to the controlling unit 4 by a second PCI Express bus 10. That is, the controlling unit 4 has a plurality of PCI Express interfaces for connection with other units.

The first ASIC 3 receives scanned image data from the scanner 2, performs image processing on the image data, and outputs resultant image data to the controlling unit 4. The image processing in the first ASIC 3 includes γ correction, color conversion, shading correction, tone correction, background correction, compression/decompression, and resolution conversion. The first ASIC 3 is connected to a HDD 11 to store image data.

The second ASIC 5 receives the image data from the controlling unit 4, performs image processing on the image data, and outputs resultant image data to the printer 6. The image processing in the second ASIC 5 includes enlarge/reduce, rotation, compression/decompression, and stamp composition.

Given below is the description of a general flow of storing image data in the HDD 11 and the RAM 8.

Upon receiving image data from the scanner 2, the first ASIC 3 compresses the image data in real time to obtain compressed image data in, e.g., joint photographic experts group (JPEG) format, and then sent it to a predetermined address in the RAM 8 via the controlling unit 4.

The compressed image data is read from the RAM 8 by the controlling unit 4 and stored in the HDD 11 via the first ASIC 3, or subjected to image processing such as decompression, color conversion, and tone correction in the first ASIC 3, and returned to the RAM 8 via the controlling unit 4. The image data subjected to such image processing is then sent from the RAM 8 to the second ASIC 5 if required, subjected to image processing such as rotation, and returned to the RAM 8 via the controlling unit 4. The image data thus obtained is then sent from the RAM 8 to the printer 6 via the controlling unit 4 and the second ASIC 5.

Meanwhile, the rate of data transfer is different in each unit in the image processing system. Thus, it is necessary to regulate a precise rate of data transfer. That can be achieved by using virtual channels and an arbitration function. That is, a PCI Express bus is allotted to virtual channels on a time sharing basis for transferring packet data of a plurality of traffics and the priority of the packet data for each virtual channel is then arbitrated.

The memory controller 4b performs memory arbitration of the CPU 4a as well as the units connected to the controlling unit 4 externally. While performing memory arbitration, the memory controller 4b gives precedence to memory access requests (packet data) received through external PCI Express buses, i.e., particularly from the first ASIC 3 and the second ASIC 5, than memory access requests from the CPU 4a.

As described above, the first ASIC 3 and the second ASIC 5 are connected to the controlling unit 4, which is a root device, by independent high-speed serial PCI Express buses 9 and 10, respectively. The memory controller 4b gives precedence to memory access requests issued by the first ASIC 3 and the second ASIC 5. Thus, it is possible to secure a sufficient bandwidth for data transfer as compared to a conventional PCI bus, and maintain isochronous data transfer with respect to the first ASIC 3 and the second ASIC 5.

Moreover, the scanned image data (red-green-blue (RGB) data in JPEG format) is stored in the HDD 11 that is connected to the first ASIC 3. Such a configuration in which an interface for the HDD 11 is provided at the first ASIC 3 has smaller latency period than a configuration in which the interface is provided at the second ASIC 5. As a result, it is possible to enhance productivity and scalability of the image processing system, and achieve low manufacturing cost.

In addition to the above configuration, the controlling unit 4 is connected to a plurality of optional hardware devices via a PCI bus 14. The optional hardware devices include an I/O device 15, a facsimile (fax) board 16 with a fax control unit (FCU) mounted thereon, and an interface (I/F) converter 17 that is connected to an operating unit 18. However, the optional hardware devices are not limited to the abovementioned devices. The optional hardware devices are connected to the controlling unit 4 via the PCI bus 14 independently of the first ASIC 3 and the second ASIC 5. The I/F converter 17 can be, e.g., a universal serial bus (USB) to achieve high-speed data transfer between the operating unit 18 and the controlling unit 4 such that a large image data can be displayed. Moreover, by using a USB for data transfer, it is possible to independently change configuration settings of the operating unit 18 irrespective of the image processing system.

Given below is the description of a general flow of printing image data received via fax in the image processing system.

Upon receiving image data by fax, the fax board 16 sends the image data to the controlling unit 4 via the PCI bus 14 to store it in the RAM 8. The image data is read from the RAM 8, subjected to image processing such as soft decoding and resolution conversion in the controlling unit 4, and returned to the RAM 8. The image data in the RAM 8 is then read by the controlling unit 4 and sent to the printer 6 via the second ASIC 5.

The above configuration in which the optional hardware devices are connected to the controlling unit 4 by the PCI bus 14 as an independent path does not interfere with the image processing functionality of the first ASIC 3 and the second ASIC 5. Hence, it is possible to secure a sufficient bandwidth for data transfer and maintain isochronous data transfer with respect to the first ASIC 3 and the second ASIC 5, which results in enhanced productivity of the image processing system.

Given below is the description of a general flow of displaying a thumbnail-size image of data stored in the HDD 11.

Image data is read from the HDD 11 and stored in the RAM 8 via the first ASIC 3 and the controlling unit 4. The image data is then read from the RAM 8 by the controlling unit 4 and sent therefrom to the I/F converter 17 via the PCI bus 14. The I/F converter 17 converts the image data to a format compatible to the interface of the operating unit 18, and then output it to the operating unit 18. The image data is subjected to image processing such as magnification and color conversion in the operating unit 18, and output to a liquid crystal display (LCD) panel (not shown).

Even in case the volume of image data to be transferred to the operating unit 18 increases, the PCI bus 14, i.e., independent path for the optional hardware devices, prevents any adverse effect on the functioning of the scanner 2 and the printer 6. Thus, it is possible to enhance overall productivity and scalability of the image processing system, and achieve low manufacturing cost.

The controlling unit 4 is also connected to a system option device 13 by a PCI Express bus 12. The system option device 13 performs image format conversion. In this case also, the PCI Express bus 12 is independent of the first PCI Express bus 9 and the second PCI Express bus 10.

Given below is the description of a general flow of delivering image data over a network.

Upon receiving image data from the scanner 2, the first ASIC 3 compresses the image data in real time to obtain compressed image data in, e.g., JPEG format, and then sent it to a predetermined address in the RAM 8 via the controlling unit 4.

The compressed image data is read from the RAM 8 by the controlling unit 4 and stored in the HDD 11 via the first ASIC 3, or subjected to image processing such as decompression, magnification, resolution conversion, and color conversion in the system option device 13, and returned to the RAM 8 via the controlling unit 4. The image data subjected to such image processing is then delivered from the RAM 8 over a network via the PCI bus 14 and the I/O device 15.

Because the PCI Express bus 12, i.e., a high-speed serial bus for connection between the controlling unit 4 and optional hardware devices, is independent of the first PCI Express bus 9 and the second PCI Express bus 10, it is possible to secure a sufficient bandwidth for data transfer as compared to a conventional PCI bus.

The controlling unit 4 also has an Ethernet port 19 for connecting an optional hardware device (not shown) that can be used for application extension or performance acceleration. The optional hardware device is connected to the controlling unit 4 independently of the first ASIC 3 and the second ASIC 5. The optional hardware device is not limited to the abovementioned functionalities.

Given below is the description of a general flow of delivering image data over a network when an optional hardware device for performance acceleration is used.

Upon receiving image data from the scanner 2, the first ASIC 3 compresses the image data in real time to obtain compressed image data in, e.g., JPEG format, and then sent it to a predetermined address in the RAM 8 via the controlling unit 4.

The compressed image data is read from the RAM 8 by the controlling unit 4 and stored in the HDD 11 via the first ASIC 3, or sent to an optional hardware device for performance acceleration from the data controlling unit 4 via the Ethernet port 19. The compressed image data is subjected to image processing such as decompression, magnification, resolution conversion, and color conversion in the optional hardware device, and returned to the RAM 8 via the Ethernet port 19 and the controlling unit 4. The image data subjected to such image processing is then delivered from the RAM 8 over a network via the PCI bus 14 and the I/O device 15.

Because an optional hardware device for application extension or performance acceleration is connected by an independent network interface such as the Ethernet port 19, it is possible to achieve enhanced scalability and productivity of the image processing system.

To sum up, according to the embodiment of the present invention, the controlling unit 4 functions as the root device of the image processing system. The first ASIC 3 performs image processing on image data received from the scanner 2. The second ASIC 5 performs image processing on image data to be output to the printer 6. The controlling unit 4 is connected to the first ASIC 3 by the first PCI Express bus 9 and to the second ASIC 5 by the second PCI Express bus 10. As a result, it is possible to secure a sufficient bandwidth for data transfer as compared to a conventional PCI bus. Moreover, the controlling unit 4 is configured to collectively manage storage units such as the ROM 7 and the RAM 8 in which the image data is stored. Thus, the need of having a plurality of distributed storage units is eliminated, which results in reducing the manufacturing cost of the image processing system.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A controlling device, comprising:
   a controlling unit;
   a plurality of serial buses that are independently provided for a plurality of units to connect the units to the controlling unit;
   a first image processing unit that is connected to the controlling unit by a first serial bus of the plurality of serial buses, and performs image processing on image data;
   a second image processing unit that is connected to the controlling unit by a second serial bus of the plurality of serial buses, and performs image processing on image data; and
   a storage unit that is connected to the controlling unit, and that stores therein image data processed by the first image processing unit, the image data stored in the storage unit being sent from the storage unit to the second image processing unit, wherein
   the first image processing unit is connected to the controlling unit via a first port of the controlling unit, the first port being arranged downstream of the first image processing unit, and before the image data is stored in the storage unit, the image data is sent to the first image processing unit and then sent to the controlling unit,
   the second image processing unit is connected to the controlling unit via a second port of the controlling unit, the second port being arranged upstream of the second image processing unit, and after the image data is output from the storage unit, the image data is sent to the controlling unit and then sent to the second image processing unit, and
   the first port and the second port are different.

2. The controlling device according to claim 1, wherein the controlling unit includes a memory controller that gives precedence to a request for accessing the storage unit issued by the first image processing unit and the second image processing unit.

3. The controlling device according to claim 1, further comprising a high-speed serial bus as an interface to an optional hardware device such that the optional hardware device is connected to the controlling unit independently of the first image processing unit and the second image processing unit.

4. The controlling device according to claim 1, further comprising a parallel bus as an interface to an optional hardware device such that the optional hardware device is connected to the controlling unit independently of the first image processing unit and the second image processing unit.

5. The controlling device according to claim 4, wherein the optional hardware device is an interface conversion device via which the controlling unit is connected to an operating unit that receives operational instructions from a user.

6. The controlling device according to claim 1, further comprising a network interface to an optional hardware device such that the optional hardware device is connected to the controlling unit independently of the first image processing unit and the second image processing unit.

7. The controlling device according to claim 1, wherein the first image processing unit is connected to a hard disk drive that stores therein the image data.

8. The controlling device according to claim 1, wherein each of the first image processing unit and the second image processing unit correspond to an application specific integrated circuit (ASIC) for image processing.

9. The controlling device according to claim 1, wherein the storage unit is connected only to the controlling unit.

10. An image processing system, comprising:
a scanner that scans an image and outputs image data of scanned image;
a printer that prints the image on a recording medium based on the image data; and
a controlling device that includes
a controlling unit,
a plurality of serial buses that are independently provided for a plurality of units to connect the units to the controlling unit,
a first image processing unit that is connected to the controlling unit by a first serial bus of the plurality of serial buses, and performs image processing on the image data output by the scanner,
a second image processing unit that is connected to the controlling unit by a second serial bus of the plurality of serial buses, and performs image processing on the image data, and
a storage unit that is connected to the controlling unit, and that stores therein image data processed by the first image processing unit, the image data stored in the storage unit being sent from the storage unit to the second image processing unit, wherein
the first image processing unit is connected to the controlling unit via a first port of the controlling unit, the first port being arranged downstream of the first image processing unit, and before the image data is stored in the storage unit, the image data is sent to the first image processing unit and then sent to the controlling unit,
the second image processing unit is connected to the controlling unit via a second port of the controlling unit, the second port being arranged upstream of the second image processing unit, and after the image data is output from the storage unit, the image data is sent to the controlling unit and then sent to the second image processing unit, and
the first port and the second port are different.

11. The image processing system according to claim 10, wherein the controlling unit includes a memory controller that gives precedence to a request for accessing the storage unit issued by the first image processing unit and the second image processing unit.

12. The image processing system according to claim 10, further comprising a high-speed serial bus as an interface to an optional hardware device such that the optional hardware device is connected to the controlling unit independently of the first image processing unit and the second image processing unit.

13. The image processing system according to claim 10, further comprising a parallel bus as an interface to an optional hardware device such that the optional hardware device is connected to the controlling unit independently of the first image processing unit and the second image processing unit.

14. The image processing system according to claim 13, wherein the optional hardware device is an interface conversion device via which the controlling unit is connected to an operating unit that receives operational instructions from a user.

15. The image processing system according to claim 10, further comprising a network interface to an optional hardware device such that the optional hardware device is connected to the controlling unit independently of the first image processing unit and the second image processing unit.

16. The image processing system according to claim 10, wherein the first image processing unit is connected to a hard disk drive that stores therein the image data scanned by the scanner.

17. The image processing system according to claim 10, wherein each of the first image processing unit and the second image processing unit correspond to an application specific integrated circuit (ASIC) for image processing.

18. The image processing system according to claim 10, wherein the storage unit is connected only to the controlling unit.

19. A controlling device, comprising:
a controller;
a plurality of serial buses;
a first image processing circuit that is connected to the controller by a first serial bus of the plurality of serial buses, and performs image processing on image data;
a second image processing circuit that is connected to the controller by a second serial bus of the plurality of serial buses, and performs image processing on image data; and
a memory that is connected to the controller, and that stores therein image data processed by the first image processing circuit, the image data stored in the memory being sent from the memory to the second image processing circuit, wherein
the first image processing circuit is connected to the controller via a first port of the controller, the first port being arranged downstream of the first image processing circuit, and before the image data is stored in the memory, the image data is sent to the first image processing circuit and then sent to the controller,
the second image processing circuit is connected to the controller via a second port of the controller, the second port being arranged upstream of the second image processing circuit, and after the image data is output from the memory, the image data is sent to the controller and then sent to the second image processing circuit, and
the first port and the second port are different.

* * * * *